United States Patent
Katrinecz, Jr. et al.

(10) Patent No.: US 6,773,128 B2
(45) Date of Patent: Aug. 10, 2004

(54) LOW POWER, LOW COST ILLUMINATED KEYBOARDS AND KEYPADS

(75) Inventors: Andrew J. Katrinecz, Jr., Shalimar, FL (US); David C. Byrd, Bellingham, MA (US)

(73) Assignee: Twenty-First Century Technology, Inc., Bellingham, MA (US)

(*) Notice: Subject to any disclaimer, the term of this patent is extended or adjusted under 35 U.S.C. 154(b) by 0 days.

(21) Appl. No.: 09/755,775

(22) Filed: Jan. 4, 2001

(65) Prior Publication Data

US 2001/0002166 A1 May 31, 2001

Related U.S. Application Data

(62) Division of application No. 09/139,927, filed on Aug. 26, 1998, now Pat. No. 6,199,996.

(51) Int. Cl.[7] ............................................. F21V 9/16
(52) U.S. Cl. .................... 362/84; 362/85; 362/109; 362/234; 345/163
(58) Field of Search ......................... 362/84, 85, 109, 362/234; 200/317; 345/8, 163, 166

(56) References Cited

U.S. PATENT DOCUMENTS

| | | | |
|---|---|---|---|
| 3,395,058 A | 7/1968 | Kennedy | 156/67 |
| 4,060,703 A * | 11/1977 | Everett, Jr. | 200/317 |
| 4,104,555 A | 8/1978 | Fleming | 313/512 |
| 4,159,559 A | 7/1979 | Robinson, Sr. | 29/25.14 |
| 4,163,883 A | 8/1979 | Boulanger | 200/314 |
| 4,177,501 A | 12/1979 | Karlin | 362/26 |
| 4,238,793 A | 12/1980 | Hochstrate | 340/781 |
| 4,288,672 A | 9/1981 | Puccini | 200/314 |
| 4,320,268 A | 3/1982 | Brown | 200/5 A |
| 4,343,975 A | 8/1982 | Sado | 200/314 |
| 4,365,120 A | 12/1982 | Pounds | 200/5 A |
| 4,443,832 A | 4/1984 | Kanamori et al. | 362/84 |
| 4,449,024 A | 5/1984 | Stracener | 200/317 |
| 4,513,023 A | 4/1985 | Wary | 427/54.1 |
| 4,560,902 A | 12/1985 | Kardon | 313/502 |
| 4,593,228 A | 6/1986 | Albreechtson et al. | 313/509 |
| 4,619,624 A | 10/1986 | Kerr, III et al. | 455/22 |
| 4,647,337 A | 3/1987 | Simopoulos et al. | 156/633 |
| 4,684,353 A | 8/1987 | deSouza | 445/51 |
| 4,788,629 A | 11/1988 | Handy et al. | 362/23 |
| 4,857,416 A | 8/1989 | Kreiling et al. | 428/690 |
| 4,864,473 A | 9/1989 | Tokarz et al. | 362/84 |
| 4,882,581 A | 11/1989 | Inobe et al. | 341/22 |
| 4,902,567 A | 2/1990 | Eilertsen et al. | 428/328 |
| 5,051,654 A | 9/1991 | Nativi et al. | 313/506 |
| 5,317,497 A | 5/1994 | Belek | 363/40 |
| 5,397,867 A | 3/1995 | Demeo | 200/5 A |
| 5,408,060 A | 4/1995 | Muurinen | 200/314 |
| 5,412,544 A | 5/1995 | Derrick et al. | 362/84 |
| 5,563,472 A | 10/1996 | Cassidy | 315/119 |
| 5,568,367 A | 10/1996 | Park | 362/109 |
| 5,655,826 A | 8/1997 | Kouno et al. | |
| 5,662,408 A | 9/1997 | Marischen | 362/226 |
| 5,692,956 A * | 12/1997 | Rifkin | 345/163 |
| 5,899,553 A | 5/1999 | Howell | 362/84 |
| 6,030,088 A * | 2/2000 | Scheinberg | 362/85 |
| 6,140,981 A * | 10/2000 | Kuenster et al. | 345/8 |

FOREIGN PATENT DOCUMENTS

DE          29711813 U1    10/1997

* cited by examiner

Primary Examiner—Stephen F Husar

(57) ABSTRACT

Methods are provided for adapting existing manufacturing processes for non-illuminated data-entry devices and mouses to the manufacture of illuminated data-entry devices. Luminescent sheets of one or more colors underlying optically transmissive device components provide illumination of the components visual to a user of the device. The optically transmissive components may be doped with phosphors or tinted to provide components that emit light of different colors. The intensity of illumination of the luminescent sheet may be controlled by the user and may vary in response to the background light of the environment.

1 Claim, 6 Drawing Sheets

LOW POWER, LOW COST ILLUMINATED KEYBOARDS AND KEYPADS

This application is Div of Ser. No. 09/139,927 filed Aug. 26, 1998, now U.S. Pat. No. 6,199,996.

FIELD OF THE INVENTION

The present invention relates to illumination of keyboards, keypads, and other data entry devices.

BACKGROUND OF THE INVENTION

Keyboards, keypads, mouses, and other data entry devices (hereinafter referred to generally as keyboards) are used in a variety of applications for entry of alphanumeric and other types of data into a machine such as a calculator or computer. Keyboards have been developed that are light weight, low in cost, and relatively easy to manufacture. However, difficulty has been encountered in the development of illuminated keyboards that are light weight, low in cost and easy to manufacture. For example, methods have been developed which require placement of a light source below and in proximity of each key of the keyboard, and each of these light sources must be connected to a power supply, rendering the manufacture of such a keyboard difficult and expensive. Another method for illuminating a keyboard requires a single light source that provides light to each key by means of optical light paths. The optical light paths are difficult to construct in order to illuminate the keys uniformly and efficiently. These methods have the disadvantage of requiring considerable power for illumination, an important consideration for laptop computers and calculators operating under battery power. Moreover, all of these methods are unsuitable for many of the new keyboards that have been developed which are not flat, such as ergonomic keyboards that arc upward and outward from a horizontal surface. More generally, none of the methods of the prior art are readily adaptable to existing keyboard manufacturing processes. Thus, the manufacturing process for manufacturing ordinary non-illuminated keyboards cannot readily and easily be adapted to the manufacture of illuminated keyboards.

SUMMARY OF THE INVENTION

An object of the present invention is to provide methods for manufacture of illuminated keyboards that can easily be adapted and incorporated into the manufacture processes that exist for non-illuminated keyboards.

Another object of the present invention is to provide methods for manufacture of illuminated keyboards that may be applied to keyboards of any shape, including ergonomic keyboards.

Another object of the present invention is to provide uniform illumination of the keys in a manner that does not require implementation of complex optical pathways or separate light sources for each key, and further provides illumination that consumes very low power.

Yet another object of the present invention is to provide illumination that possesses controllable visual functionality as well as aesthetic attributes.

According to one aspect of the present invention a flexible, thin, low-power, inexpensive, luminescent sheet is adhered to the surface of the key board well plate of a keyboard. The key board well plate is manufactured in any manner and shape as required by the manufacturing process typically used and as required by the shape of the keyboard to be produced. The luminescent sheet may be adhered to the upper surface of the keyboard well plate. Alternatively, the luminescent sheet may be placed between the keyboard well plate and the circuit board of the keyboard. In this configuration the keyboard well plate is made from any optically transmissive material possessing sufficient rigidity to function as a key board well plate. Such materials, such as plexi-glass and other moldable plastics are well known in the art. The keys are also manufactured as required by the manufacturing process ordinarily used, except that the keys are made from an optically transmissive material, and may further contain phosphorescent material that glows residually during and after illumination. The luminescent sheet may be easily connected to a battery or any available power source, including the source that provides power to the keyboard itself. Further, the luminescent sheet may be connected to a device such as a rheostat to allow the user to vary the intensity of illumination. Also, a photo cell may be connected to the source of power of the luminescent sheet to cause the intensity of light from the sheet to automatically vary in response to the darkness of the environment in which the keyboard is used.

According to the present invention, luminescent sheets of different colors can be placed under different sections of keys to improve visual differentiation of key groups. Also, the optically transmissive keys can be tinted so that the same luminescent sheets will cause keys tinted by different colors to appear in different colors. Similarly, the top plate of the keyboard which is normally opaque can also be manufactured from an optically transmissive material so that the entire upper surface of the keyboard will be illuminated. The top plate may be tinted to provide visual contrast. Also, one luminescent sheet of one color can be applied to illuminate the top plate with a color that is different from the color of the luminescent sheet that illuminates the keys. All of these features may be combined to provide an illuminated keyboard that possesses controllable visual functionality and aesthetic attributes. Further, the methods of the present invention disclosed herein can be implemented by persons of ordinary skill in the art to convert existing keyboards into illuminated keyboards.

These and other features, aspects and advantages of the present invention will become apparent and better understood with reference to the following written description, attached drawings, and appended claims.

DETAILED DESCRIPTION OF THE PREFERRED EMBODIMENTS

Figure 1:
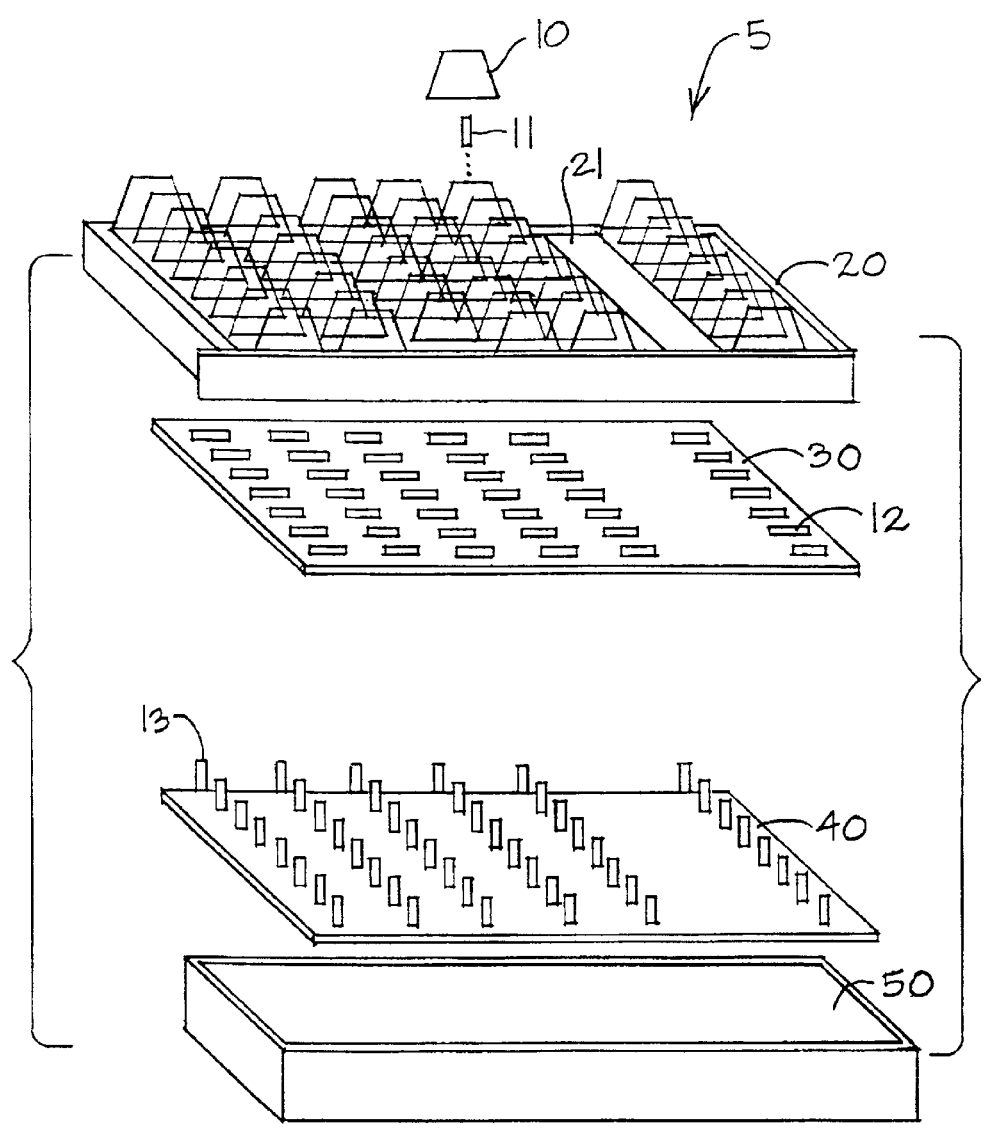
FIG. 1 illustrates a construction of a typical keyboard.

A functional diagram of the construction of a typical keyboard is shown in FIG. 1. Typically, a keyboard 5 is comprised of keypads 10, keystems 11, a keyboard top plate 20, a keyboard well plate 30, a circuit board 40 with key spring switches 13 and a key board bottom plate 50. Typically all of these components are manufactured of opaque materials. Keystems 11 are inserted through holes 12 in keyboard well plate 30. Holes 12 in keyboard well plate 30 are aligned with key spring switches 13 of circuit board 40. Circuit board 40 is secured to key board bottom plate 50. Key board top plate 20 fits over or otherwise attaches to key board bottom plate 50, and thereby provides enclosure for the keyboard. Typically, keys are grouped in a keyboard according to function. For example, on a typical keyboard for typing words and data into a word processor, a set of alphabet keys, number keys, and other certain symbol keys are grouped together in a traditional typewriter key layout, herein referred to as the typewriter keys. Another separately grouped set of keys are the arrow keys which allow control of a cursor displayed on a video monitor. Function keys are separately grouped in a single line across the upper portion of the key board. Etc. These separately grouped sets of keys will be referred to as key groups. Top plate 20 is designed so that when placed in position, the keypads 10 extend through top plate 20 while the areas between key groups are covered by surface 21 of top plate 20.

Figure 2:
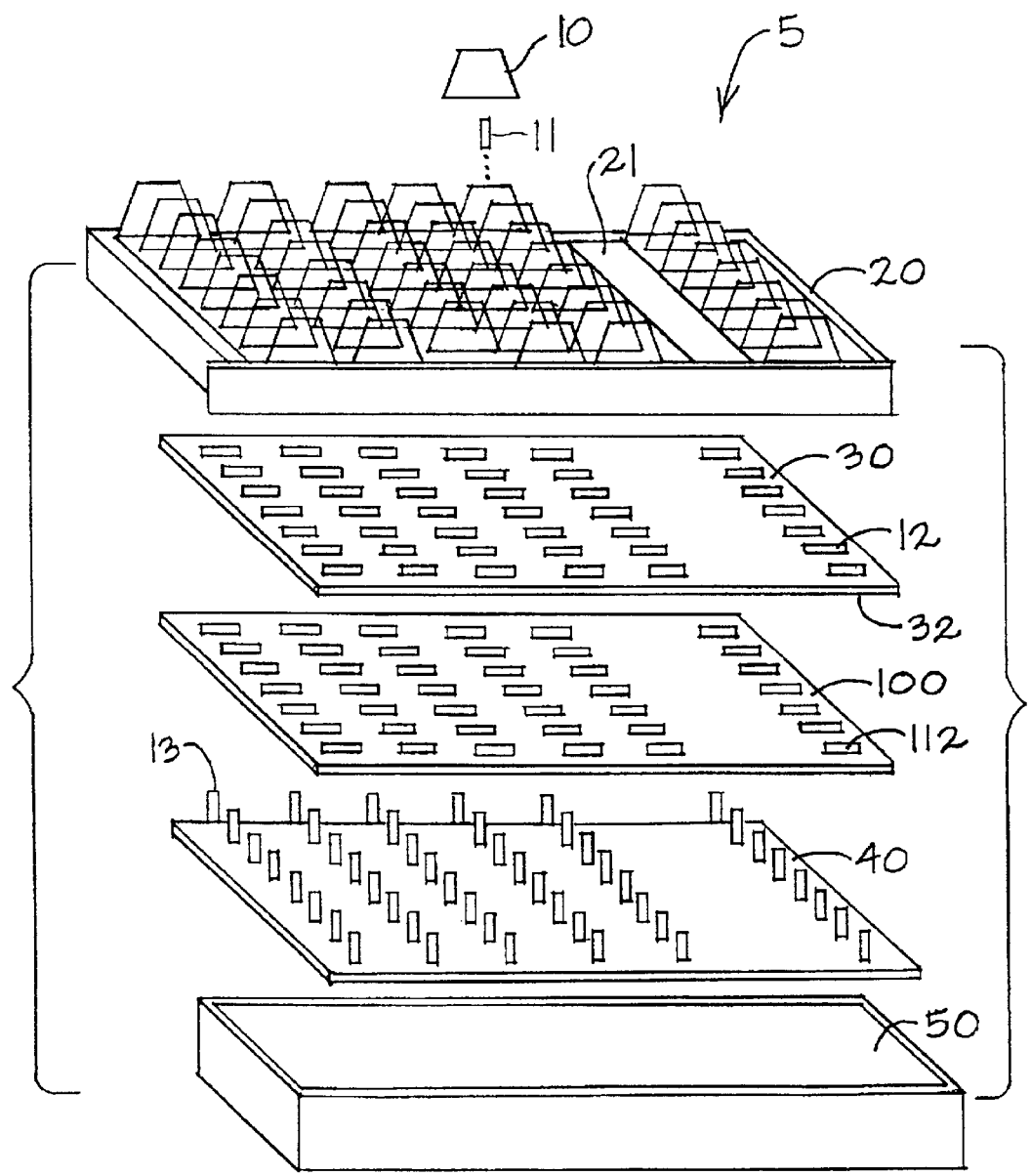
FIG. 2 illustrates placement of a luminescent sheet below a well plate.

A preferred embodiment of the present invention is illustrated in FIG. 2. A flexible luminescent sheet 100 is adhered to the lower surface 32 of key board well plate 30 that faces the surface of circuit board 40. Any suitable substance known in the art that is optically transmissive may be used to adhere luminescent sheet 100 to lower surface 32. Alternatively, flexible luminescent sheet 100 may be placed between keyboard well plate 30 and circuit board 40 without the use of an adhering substance, if luminescent sheet 100 will be sufficiently compressed between keyboard well plate 30 and circuit board 40 to remain in place. Holes 112 are made in flexible luminescent sheet 100 to align with holes 12 in keyboard well plate 30.

Figure 3A:
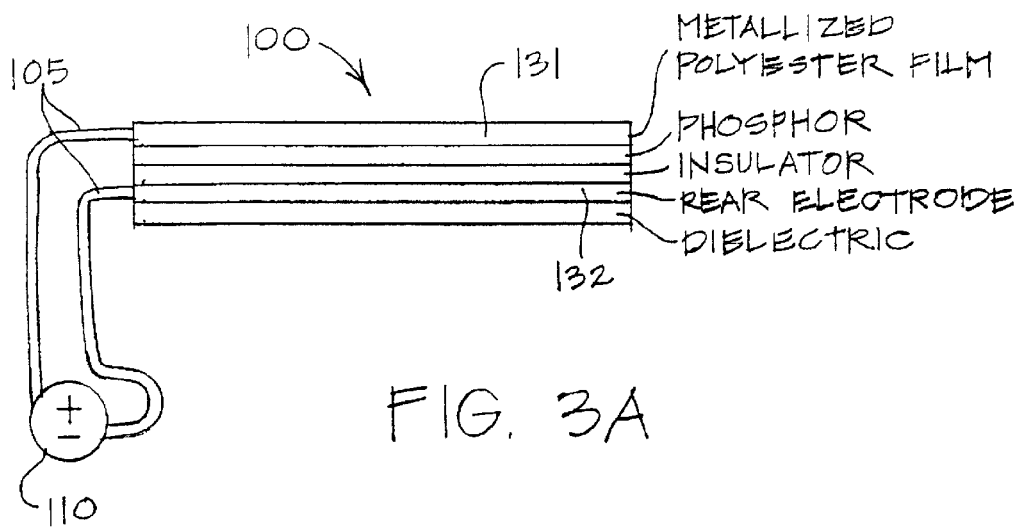
FIG. 3 illustrates construction and electrical connection of a typical luminescent sheet.

Luminescent sheet 100 is comprised of a commercially available electro-luminescent (E-L) lamp. E-L lamps are solid state devices constructed of thin phosphor-coated plastic sheets with conductive surfaces. When a power source is applied to the conductive surfaces the phosphors illuminate and light is emitted from the entire surface. E-L lamps are thin, flexible and can be twisted, bent or formed into any shape. These lamps draw very little power and produce very little heat. A typical construction of luminescent sheet 100 is illustrated in FIG. 3A. Each conductive surface, metallized polyester film 131 and rear electrode 132, is connected at an edge of sheet 100 by electric leads 105. The upper conductive surface, metallized polyester film 131, is an optically transmissive conductor. When leads 105 are connected to a power source 110, the entire sheet illuminates with an intensity that is substantially uniform across the entire surface of sheet 100. Luminescent sheets are commercially available in a variety of colors such as white, yellow, blue and green. They may be cut to order by the manufacturer, who will provide electrical tabs connected to the conductive surfaces for connection to an electrical power source. For example, flexible luminescent sheets may be obtained from SEG Corporation. SEG may be contacted through their Internet address: www.flashseg.com.

Figure 3B:
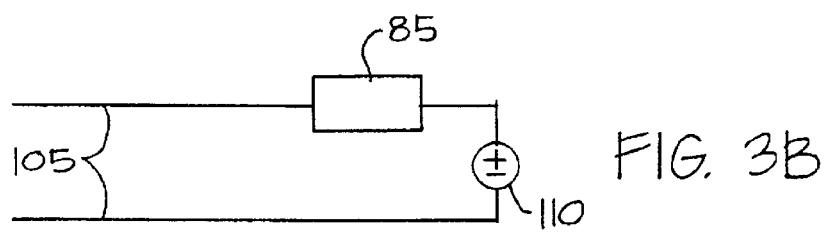
Figure 3C:
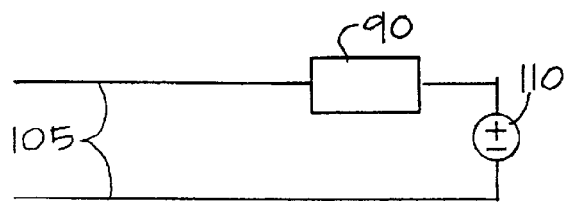

Flexible luminescent sheet 100 is connected through leads 105 to any convenient power source 110, which may be a battery or the power source of keyboard 5. The intensity of light from luminescent sheet 100 can be varied using an intensity control device 85 such as a rheostat in series with power source 110, as illustrated in FIG. 3B. In addition, or in the alternative as shown in FIG. 3B, intensity may be controlled by providing a photosensitive device 90, such as a photo-cell, and associated circuitry to control the intensity of luminescent sheet 100 in response to the intensity of light in the environment in which keyboard 5 is used. A variety of methods, devices, and circuitry for controlling the intensity of luminescent sheet 100 will readily be recognized by persons of ordinary skill in the art.

In this embodiment, keyboard well plate 30 is manufactured from an optically transmissive material. Any optically transmissive material that is sufficiently rigid to achieve the ordinary purposes of a keyboard well plate will suffice. Even a partially opaque optically transmissive material may be used as long as light of sufficient intensity is transmitted through keyboard well plate 30 to provide illumination visual to the user. Examples of materials that can be used for this purpose are plexiglass and other optically transmissive plastics. Other suitable materials will be known to persons of ordinary skill in the art. Similarly, keypads 10 and key stems 11 will be manufactured from an optically transmissive material, that is, materials that are at most only partially opaque and transmit sufficient light intensity to render the keys visual to the user. In addition, keypads 10 may comprise phosphors that will illuminate in response to the light received from luminescent sheet 100. Thus, in this embodiment, luminescent sheet 100 transmits light through keyboard well plate 30 and through keypads 10 to provide visual illumination of keyboard 5.

It may be desirable in some applications to provide a keyboard in which different keys, key groups and keyboard areas appear in different colors of illumination. A variety of methods can be implemented to achieve this according to the methods of the present invention. One method is to provide a plurality of luminescent sheets 100 of different colors under different portions of keyboard well plate 30 to cause different keys, keygroups and keyboard areas to be illuminated by different colors. Another method for providing keys of different colors is to tint the optically transmissive material from which the keys are made, so that when the keys are illuminated by a luminescent sheet 100, the key color will be a composite of the light from the luminescent sheet and the tint of the keys. Also, the optically transmissive keys from which the keys are made may be mixed with phosphors of different colors when illuminated by luminescent sheet 100.

Figure 4:
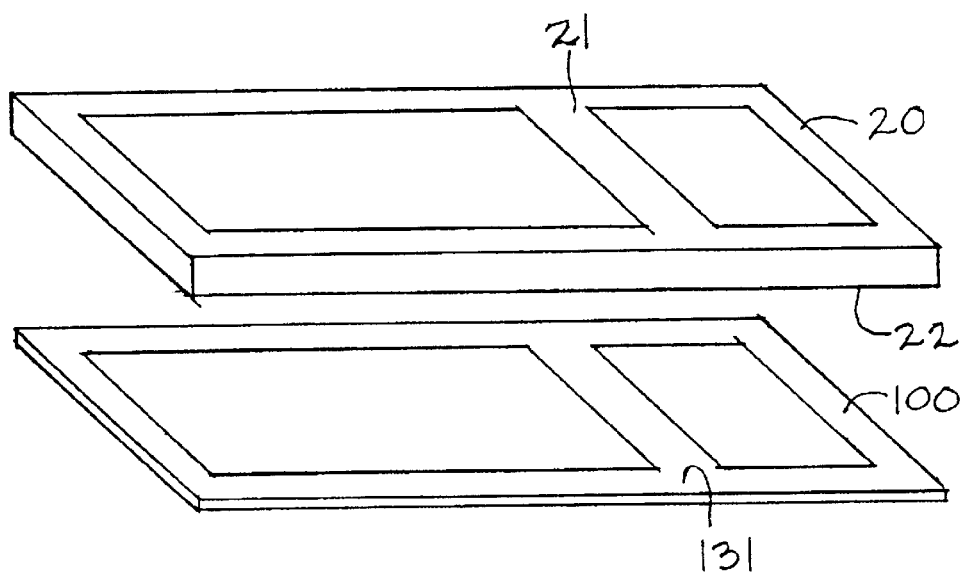
FIG. 4 illustrates an embodiment for illumination of a top plate.

A further variation of the method of illuminating a keyboard as described above is to manufacture top plate 20 of an optically transmissive material so that light from luminescent sheet 100 will transmit through the top plate to provide illumination of the top plate surface areas as well as the keys. Top plate 20 can be illuminated with a separate luminescent sheet 100 of a desired color by placing the separate luminescent sheet 100 under the surface area 22 of top plate 20, such that the upper surface are 131 of luminescent sheet 100 is aligned with surface area 22 of top pate 20, as illustrated in FIG. 4. Top plate 20 can also be made of an optically transmissive material that is tinted with a desired color and, or, mixed with phosphors to provide luminescence in response to light received from luminescent sheet 100.

Figure 5:
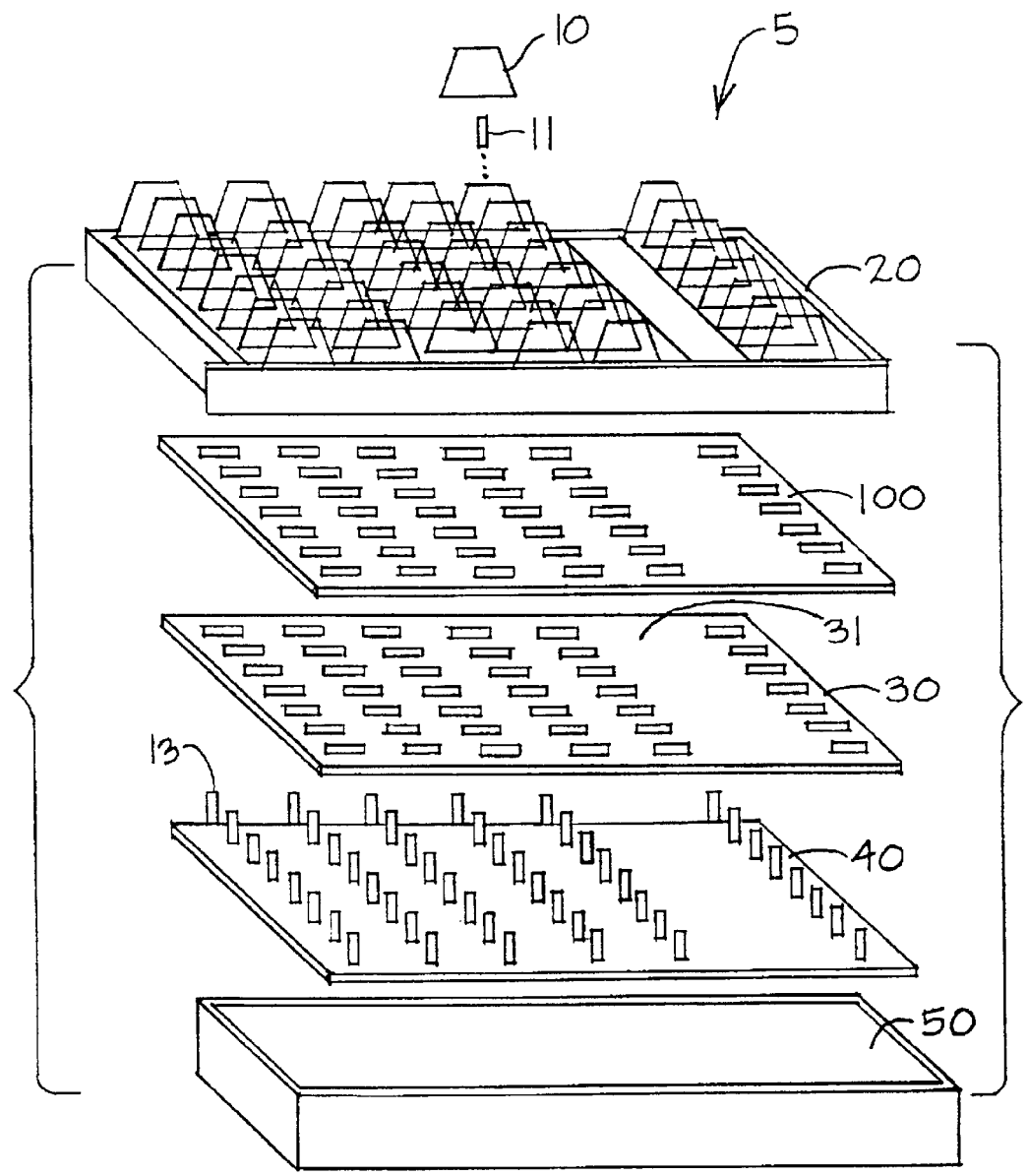
FIG. 5 illustrates placement of a luminescent sheet above a well plate.

In an alternative embodiment, luminescent sheet 100 can be adhered to the upper surface 31 of key board well plate 30, as illustrated in FIG. 5. In this configuration, keyboard well plate 40 can be made of any opaque material as is usually used, because light from luminescent sheet 100 illuminates the keys more directly without the necessity of transmission through key board well plate 30. Also, the substance used to adhere luminescent sheet 100 to upper surface 31 of keyboard well plate 30 need not be an optically transmissive material in this configuration. In this configuration the keypads 10 are made of optically transmissive material, and top plate 20 can also be illuminated as described above.

Figure 6A:
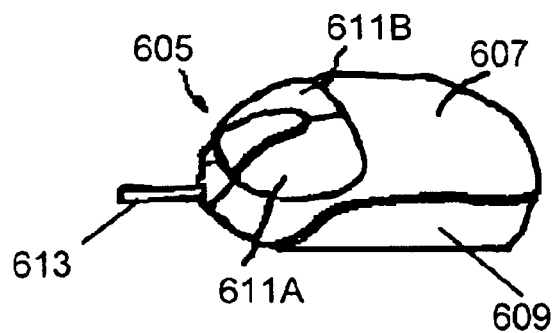
FIGS. 6A and 6B respectively illustrate a conventional mouse and an illuminated mouse of the present invention.
Figure 6B:
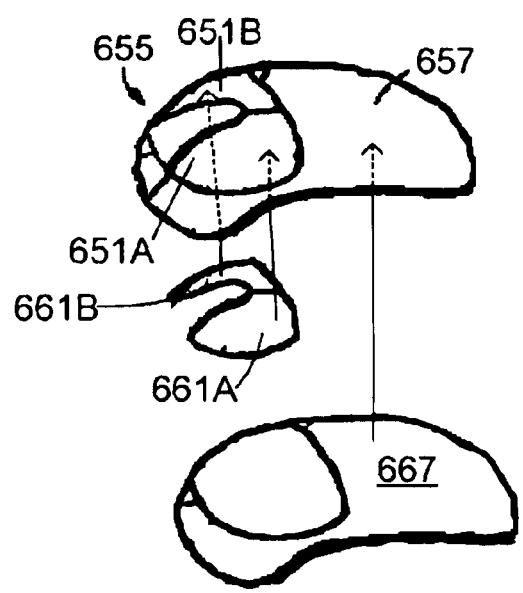

An advantage of using a flexible luminescent sheet is the ability to provide illumination for non-traditional keyboards, such as ergonomic keyboards that are arcuate in shape in one or more spatial directions. Moreover, the methods of keyboard illumination disclosed herein can readily be adapted to any keyboard manufacturing process. This would enable a manufacturer of non-illuminated keyboards to quickly and inexpensively become a manufacturer of illuminated keyboards without developing an entirely new manufacturing process to accommodate specialized configurations. Further, the methods of the present invention disclosed herein can be implemented by any person of ordinary skill in the art to convert existing keyboards into illuminated keyboards. Moreover, the methods of the present invention disclosed herein can be applied to the manufacture of an illuminated mouse, by making the mouse buttons and exterior enclosure of an optically transmissive material and underlying these components with one or more luminescent sheets connected to a suitable power source. For example, with reference to FIGS. 6A and 6B, an illuminated mouse 655 is shown based on conventional mouse 605. In the depicted drawing, conventional mouse 605 includes upper exterior enclosure 607, lower exterior enclosure 609, left/right mouse buttons 611A/B, and mouse cable 613. Illuminated mouse 657 comprises the same general design, except that upper exterior enclosure 657 and/or mouse buttons 611A/B are formed from optically transmissive materials, and a desired combination of formed E-L lamps 667, 661A, and 661B are mounted under their corresponding optically transmissive components. Underlying E-L lamps 667 and 661 may be derived from bent and/or formed E-L sheets as discussed above. In addition, a suitable power source (not shown) is connected to the E-L lamps within mouse 655.

While this invention has been described with reference to the foregoing preferred embodiments, the scope of the present invention is not limited by the foregoing written description. Rather, the scope of the present invention is defined by the following claims and equivalents thereof.

We claim:

1. An illuminated mouse comprising:
    one or more exterior mouse components comprising an optically transmissive material; and
    one or more flexible luminescent lamps underlying said one or more exterior, optically transmissive components to provide an intensity of illumination to said components visual to a user of the mouse, wherein the one or more mouse components includes an optically transmissive mouse button.

* * * * *